Dec. 7, 1943. L. D. MILLS ET AL 2,336,115
FILTER LEAF
Filed Aug. 2, 1940
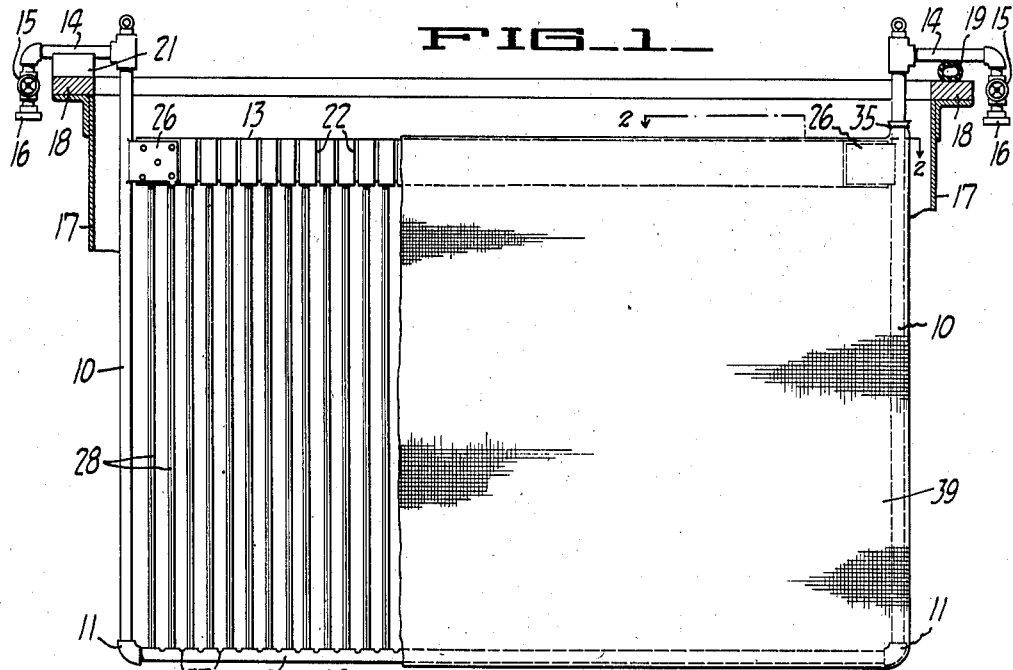
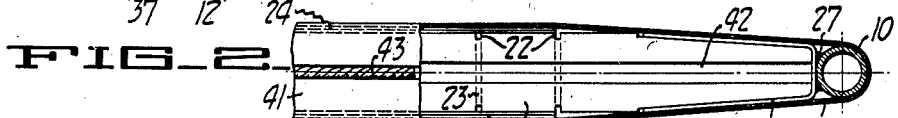
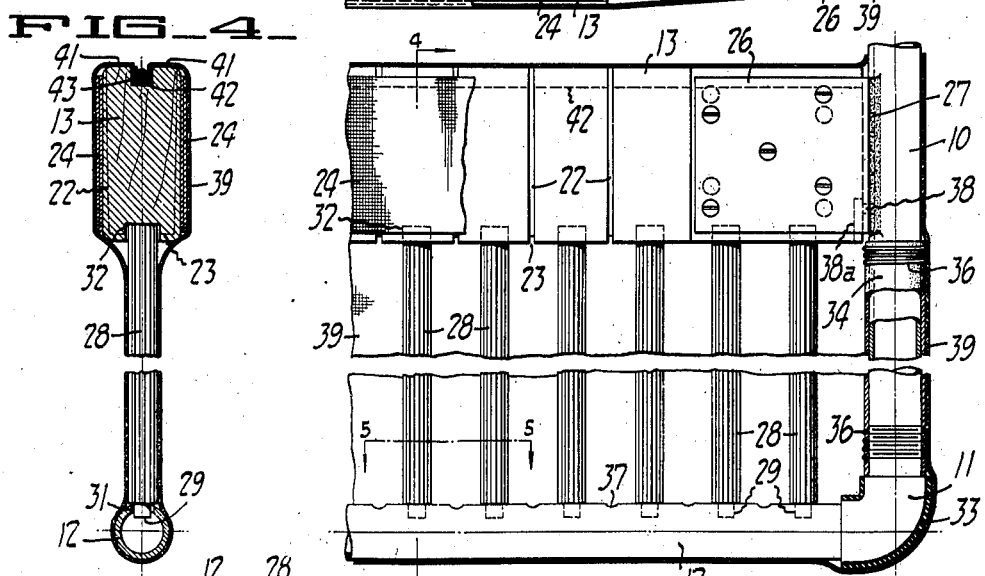
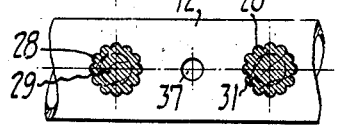
INVENTORS
Louis D. Mills
Thomas B. Crowe
Raymond Byler
BY Paul O. Fehr
ATTORNEY Patented Dec. 7, 1943

2,336,115

UNITED STATES PATENT OFFICE 2,336,115

FILTER LEAF

Louis D. Mills and Thomas B. Crowe, Palo Alto, and Raymond E. Byler, Stanford University, Calif., assignors to The Merrill Company, San Francisco, Calif., a corporation of California Application August 2, 1940, Serial No. 349,446

5 Claims. (Cl. 210—195)

This invention relates generally to the construction of filter leaves utilized in filtering equipment of the vacuum leaf type. Such filtering equipment is used for various purposes, including clarification of cyanide solutions before precipitation of precious metal.

It is an object of the invention to provide an improved filter leaf capable of withstanding relatively severe services to which such leaves are frequently put.

Another object of the invention is to provide a filter leaf in which the external filter cloth envelope is protected with respect to the rigid parts of the supporting frame, thus extending the useful life of the filter cloth.

Another object of the invention is to provide a filter leaf having a maximum available filter area for a given size of filter cloth.

A further object of the invention is to provide a novel arrangement for venting air from the upper portion of the leaf.

Additional objects of the invention will appear from the following description in which the preferred embodiment has been set forth in detail in conjunction with the accompanying drawing.

Referring to the drawing—

Fig. 1 is a side elevational view, showing a filter leaf incorporating the present invention.

Fig. 2 is an enlarged cross sectional detail taken along the line 2—2 of Fig. 1.

Fig. 3 is an enlarged detail, partly in cross section, showing details of construction which do not appear in Fig. 1.

Fig. 4 is a cross sectional view taken along the line 4—4 of Fig. 3.

Fig. 5 is a cross sectional detail taken along the line 5—5 of Fig. 3.

The filter leaf illustrated in the drawing consists of a frame which is normally covered by a filter cloth envelope. The frame consists of vertical riser pipes 10, the lower ends of which are connected by the elbow couplings 11 to the ends of a lower horizontal pipe 12. The upper portions of the riser pipes 10 are connected by the header bar 13.

For supporting the leaf in a filter tank, and to facilitate making external connections, the upper ends of the riser pipes 10 are connected to lateral extensions 14, which in turn are provided with valve cocks 15 and couplings 16.

The side walls of the filter tank in which the leaf may be positioned are indicated at 17. The upper edge of the tank is shown provided with a protective wooden strip 18. On one side of the tank a resilient element 19, such as a length of ordinary rubber hose, is carried by strip 18 to form a resilient support for pipe 14. This type of resilient support facilitates making connections between coupling 16 and a cooperating fixed coupling provided on the usual filter effluent manifold. The other side of the filter tank is shown provided with a notched block 21, for supporting the other extension 14.

The header bar 13 of the frame is preferably a wooden strip having its side faces provided with vertical drainage grooves 22. These grooves or channels are tapered in that they are deepest at their lower ends, and shallow at their upper ends. The lower ends of grooves 22 connect with the ends of lateral grooves 23 formed in the lower edge of bar 13. In order to serve as protection to the adjacent areas of the filter cloth, and also to facilitate flow of filtrate into grooves 22, the side faces of bar 13 are covered by strips 24 of pliable pervious material, such as several thicknesses of ordinary burlap.

For attaching the ends of header 13 to pipes 10, the ends of the header are tapered substantially as shown in Fig. 2, and are secured to substantially V-shaped metal straps 26, which in turn are secured by welding 27 to the pipes 10.

A plurality of spacer bars 28 extend between the header 13 and the lower pipe 12. These bars can be formed of wood of circular cross section, and with their outer surfaces corrugated or fluted as shown in Figure 4. The lower ends of the bars have studs 29 which seat within the openings 31 in pipe 12. The upper ends of the bars are seated in openings 32 in the lower edge of the header 13.

In removing or introducing a filter leaf into the filter tank, and in handling the leaf as in washing operations, the lower corners of the leaf are apt to be struck or engaged with other surfaces in such a manner as to quickly mutilate the lower corners of the filter cloth. This results in a short life for the filter cloth, or if the cloth is not immediately changed, worn openings in the cloth will cause a cloudy filtrate. To properly protect the lower corners of the filter leaf from impact, the elbows 11 are provided with a casing or sheath 33 of resilient vulcanized rubber (Figure 3) which can be cemented or bonded to the metal.

In order to protect the portions of the filter cloth which surround the riser pipes 10, and to increase the effective filter area, these pipes are covered with tubing 34 of pliable pervious material, such as burlap. The upper and lower ends of the burlap tubing are shown secured to the riser pipe, immediately below the header 13 and immediately above the coupling 11, by the binding strings 36.

Filtrate can be withdrawn from the upper end of one of the riser pipes, such as the right hand pipe shown in Figure 1. For inflow of filtrate the lower horizontal pipe 12 is provided with a series of openings 37 between the splines 28. One of the riser pipes is shown provided with an air vent opening 38 at one end of the header 13.

This opening communicates with the interior of the leaf through the recess 38a in header 13. During precoating operations a separate source of suction connects with the left hand riser pipe as shown in Figure 1, and the leaf is transferred from a separate precoat container and returned to the main filter tank while the suction is applied. Vent 38 permits the withdrawal of air from within the filter, thus preventing trapping of air and bulging of the upper part of the leaf, as it is lowered into the solution. Its positioning protects it from being blocked by the burlap covering 34.

The filter cloth 39 can be formed of any suitable material such as twill sheeting. This material makes possible rapid filtering and a minimum blinding of pores with suspended solids and with precipitated scale forming compounds like calcium carbonate or sulphate, which are always present in varying degrees in cyanide solutions. The use of this light material explains the utility of features described herein for its protection. The filter cloth is made in the form of a flat envelope which can be slipped over the frame. For retaining the cloth in place, its upper sides are provided with extension flaps 41 which can be overlapped across the top of the header 13, and pressed into the top header groove 42. A caulking rope 43 is then forced into the groove 42 to retain the flaps secured to the header. At the upper corners of the leaf the cloth is gathered about the riser pipes and tied as at 35.

Use of the filter leaf described above will be understood by those skilled in the art. It is customary to make use of a plurality of such filter leaves disposed within a common filter tank and connected to a common effluent manifold. During operation of the filter, a leaf can be individually uncoupled and removed from the tank for washing away accumulated filter cake, and if desired it may be precoated by a filter aid before the leaf is returned to the tank for normal operation. The leaf described is capable of withstanding relatively rough usage, and in addition it has a relatively high filter capacity, which is attributed in part to the pervious coverings for the side faces of the header 13, and for the riser pipes 10.

When the leaf is in use it is submerged in the solution within the filter tank 17, and suction is applied to one of the pipes 14. Filtrate is thus withdrawn from the interior of the leaf, and the filter cloth is pressed inwardly upon the frame. The areas of the filter cloth adjacent the sides of the header 13 are effective to filter solution because filtrate may flow through the pervious strips 24 and to the drainage grooves 22 and 23. Also areas of the filter cloth surrounding the riser pipes 10 are effective because filtrate may flow into and through the pervious tubing 34. Spacer bars 28 maintain the sides of the filter cloth spaced apart. Flow of filtrate from the vertical grooves 22 to the spaces between the bars is assured by the horizontal grooves 23.

We claim:

1. In a vacuum filter leaf, a frame including a pair of spaced vertically extending riser pipes, a horizontal pipe connected at its ends to the lower ends of the vertical pipes, a header bar extending between the upper portions of the vertical pipes, spacer bars extending from the lower edge of the header bar to the lower horizontal pipe, openings in the lower horizontal pipe for a flow of filtrate, a filter cloth envelope disposed upon the frame, a vent opening in one of the vertical pipes extending above the lower edge of the header bar, and a recess in the adjacent end of the header bar communicating between said opening and the interior of the leaf.

2. In a vacuum filter leaf, a frame including a horizontal header bar forming the upper edge of the frame, spacer bars extending downwardly from the header bar, drainage grooves formed in the side faces of the header bar and extending in a general vertical direction, drainage grooves formed in the lower horizontal face of the header bar, each of the last mentioned grooves connecting with the lower end of one of the first mentioned grooves and serving to conduct filtrate from the vertical grooves to the spaces between the spacer bars, and a filter cloth envelope covering the frame and the spacer bars.

3. In a vacuum filter leaf, a frame including a horizontal header bar forming the upper edge of the frame, a plurality of spacer bars extending from the lower edge of the header bar to the lower portion of the frame, vertically extending drainage grooves formed in the side faces of the header bar, grooves in the lower horizontal face of the header bar between the spacer bars, each of said last named grooves communicating with the lower ends of a pair of diametrically opposed vertical grooves and serving as a passage to conduct filtrate from the vertical grooves to the spaces between the spacer bars, and a filter cloth covering the frame and spacer bars.

4. In a vacuum filter leaf, a frame including an upper horizontal header bar forming the upper edge of the frame, a plurality of spaced vertical spacer bars extending from the lower edge of the header bar to the lower edge of the frame, vertically extending drainage grooves formed in the side faces of the header bar, grooves formed in the lower edge of the header bar between the upper ends of the spacer bars and each serving to connect with the lower end of a vertical groove, said last named grooves serving to conduct filtrate from the vertical grooves to the spaces between the spacer bars, strips of pervious material extending over the side faces of the header bar and over the first mentioned grooves, and a filter cloth envelope covering the frame.

5. In a vacuum filter leaf, a frame including a horizontal header bar forming the upper edge of the frame, a plurality of spacer bars extendings from the lower edge of the header bar to the lower portion of the frame, the thickness of the header as measured laterally of the frame being substantially greater than the diameter of the spacer bars, vertically extending drainage grooves formed in the side faces of the header bar, grooves in the lower horizontal face of the header bar between the spacer bars, each of said last named grooves communicating with the lower ends of a pair of diametrically opposed vertical grooves and serving as a passage to conduct filtrate from the vertical grooves to the spaces between the spacer bars, and a filter cloth covering the frame and spacer bars.

LOUIS D. MILLS.
THOMAS B. CROWE.
RAYMOND E. BYLER.